United States Patent [19]
Bubik

[11] Patent Number: 4,793,763
[45] Date of Patent: * Dec. 27, 1988

[54] TOWING APPARATUS WITH FRONT STOP

[75] Inventor: Leslie Bubik, Ontario, Canada

[73] Assignee: Vulcan Equipment Company Limited, Ontario, Canada

[*] Notice: The portion of the term of this patent subsequent to Jan. 20, 2004 has been disclaimed.

[21] Appl. No.: 63,015

[22] Filed: Jun. 17, 1987

Related U.S. Application Data

[60] Continuation-in-part of Ser. No. 872,137, Jun. 6, 1986, which is a division of Ser. No. 752,980, Jul. 8, 1985, Pat. No. 4,637,623.

[51] Int. Cl.4 .............................................. B60P 3/12
[52] U.S. Cl. ..................................... 414/563; 280/402
[58] Field of Search .......................... 414/563; 280/402

[56] References Cited

U.S. PATENT DOCUMENTS

| | | | |
|---|---|---|---|
| 3,877,591 | 4/1975 | Howard | 414/563 |
| 3,897,879 | 8/1975 | Bubik | 414/563 |
| 4,034,873 | 7/1977 | Haring | 414/563 |
| 4,573,857 | 3/1986 | Porter, Sr. et al. | 414/563 |
| 4,637,623 | 1/1987 | Bubik | 414/563 X |
| 4,679,978 | 7/1987 | Holmes et al. | 414/563 |

Primary Examiner—Robert J. Spar
Assistant Examiner—David A. Bucci
Attorney, Agent, or Firm—Niro, Scavone, Haller & Niro, Ltd.

[57] ABSTRACT

A towing apparatus of the wheel lift variety is provided with wheel support members and stop means to enhance the resistance of the apparatus to roll-out by operator misuse.

7 Claims, 4 Drawing Sheets

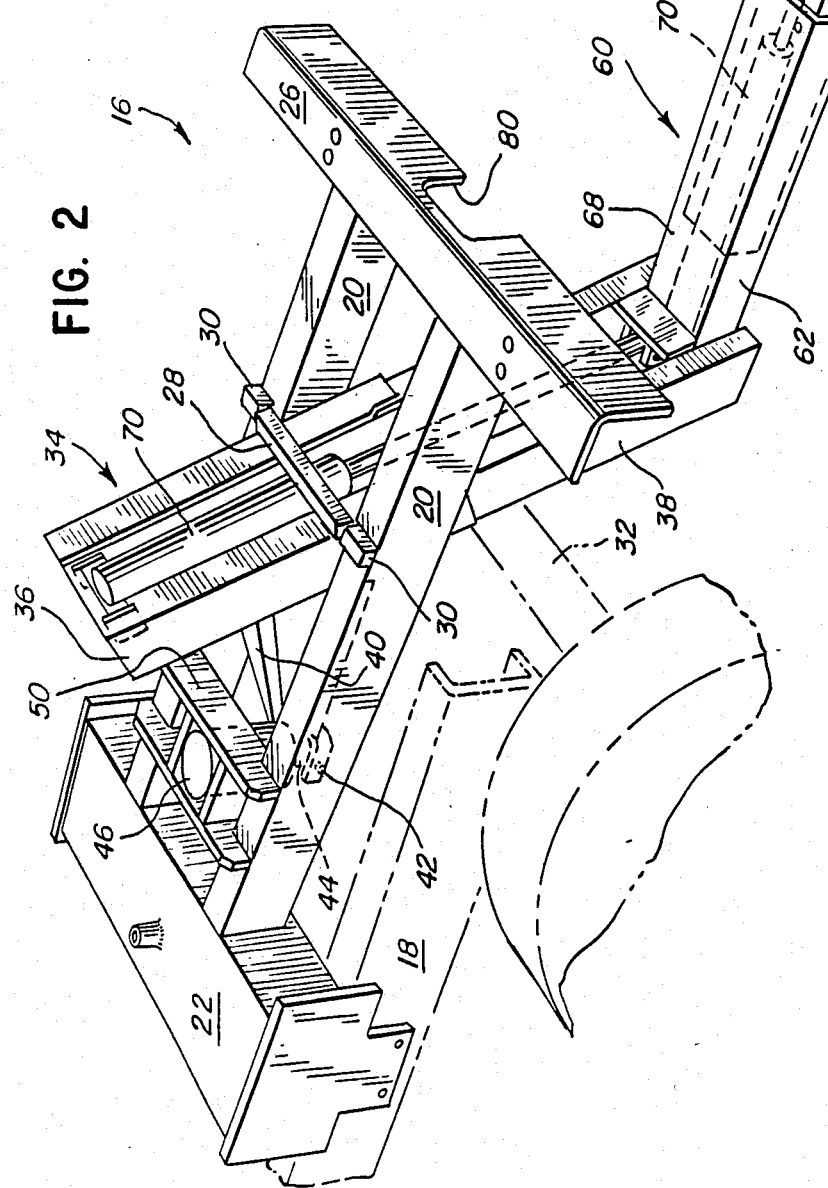

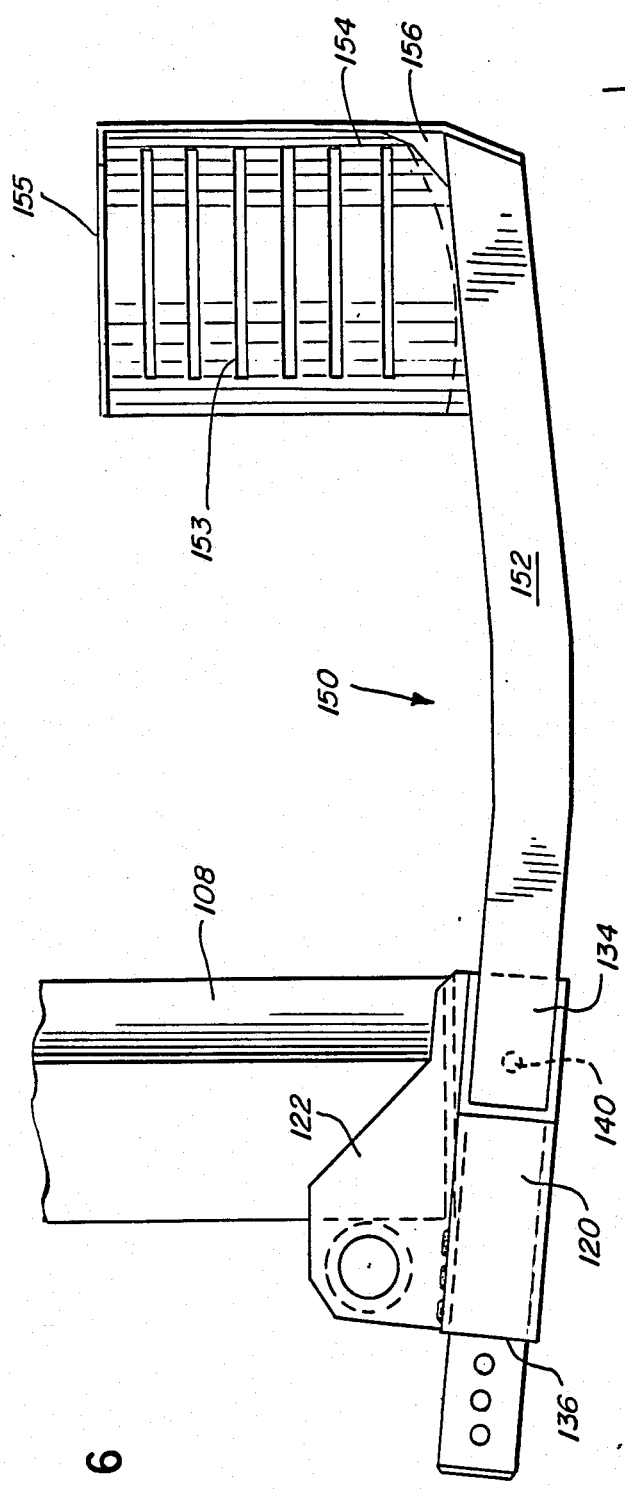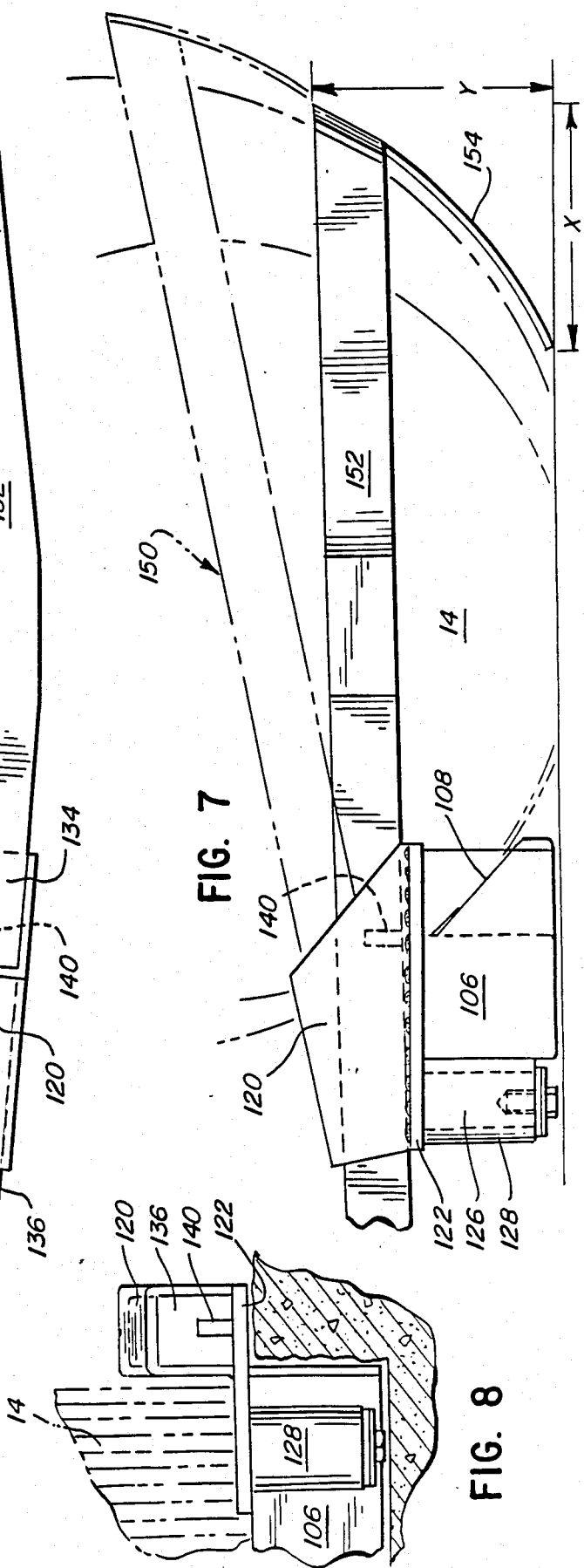
FIG. 6
FIG. 7
FIG. 8

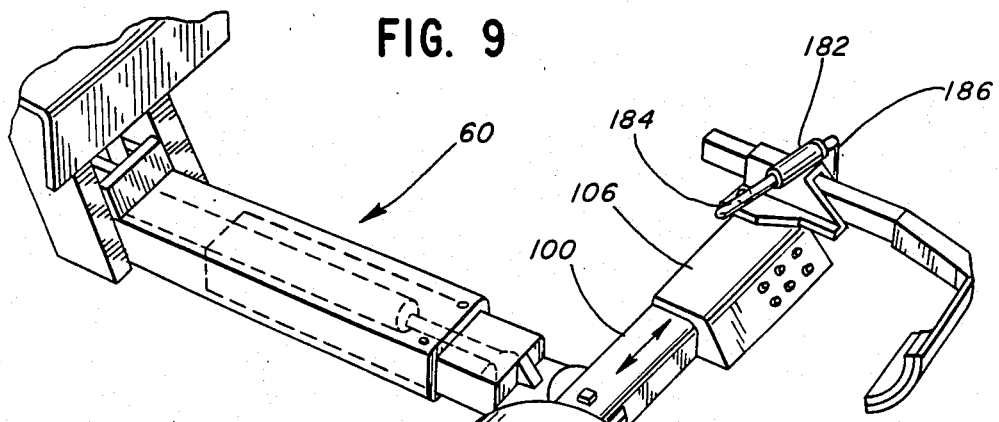
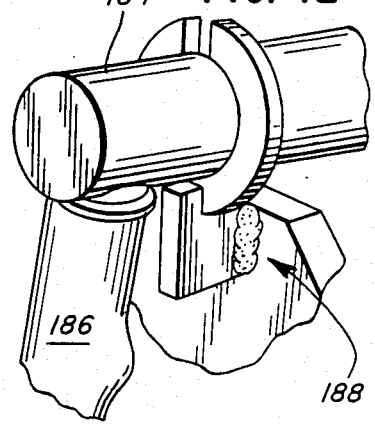
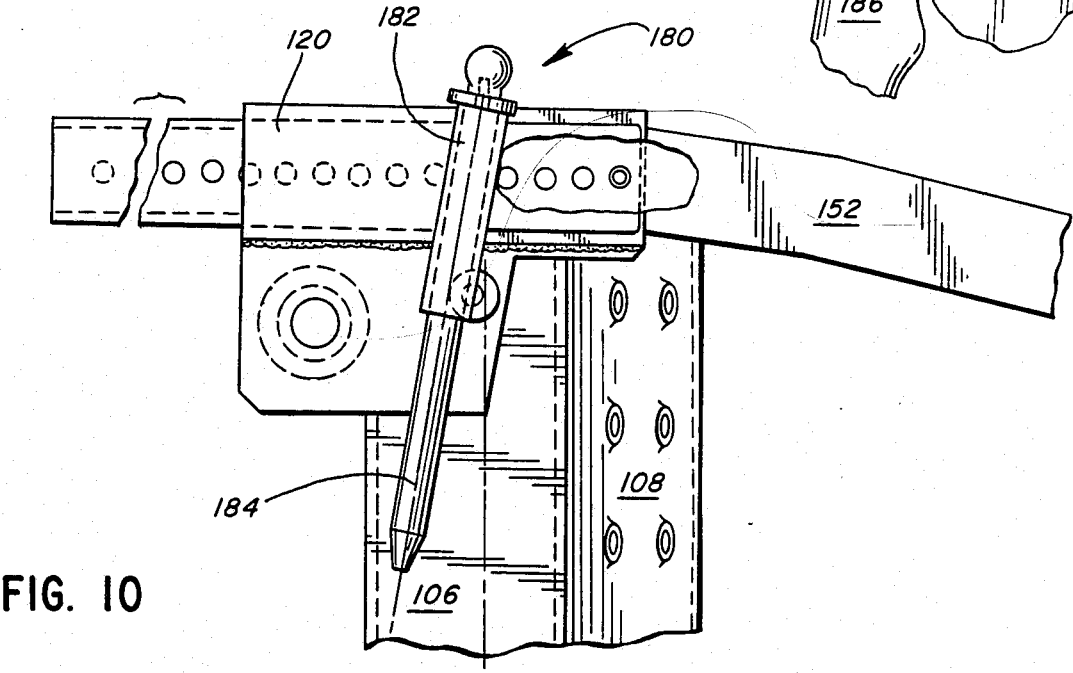
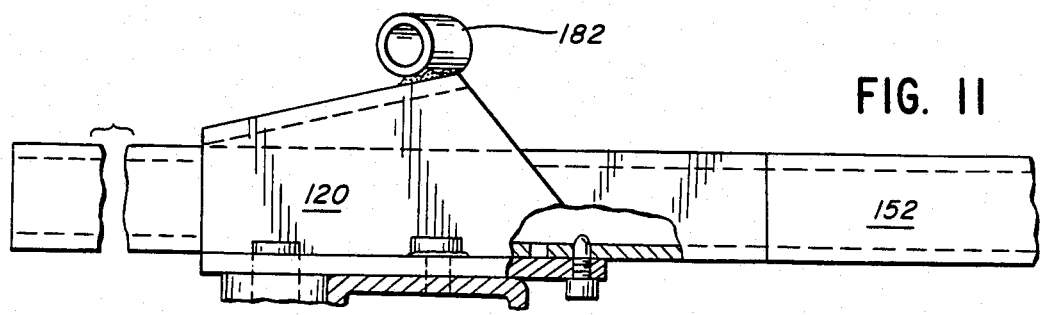

TOWING APPARATUS WITH FRONT STOP

BACKGROUND OF THE INVENTION

This application is a continuation-in-part of co-pending application Ser. No. 872,137, "Towing Apparatus", filed on June 6, 1986 which in turn is a divisional application of application Ser. No. 752,980 "Towing Apparatus", filed July 8, 1985 now U.S. Pat. No. 4,637,623.

This invention is directed to an apparatus for lifting and towing vehicles. More particularly, the present invention relates to another improved lifting and towing apparatus of the "wheel-lift" variety whereby a vehicle to be towed is supported solely or substantially by its wheels.

In recent years, the design problems confronting those in the towing apparatus industry have become increasingly complex. It is essential not only to design a safe, reliable and cost-effective product, but also to accommodate the increasingly difficult constraints imposed by changes in the design of many modern automobiles. For example, current automotive design emphasizes shock-absorbing bumpers, and a variety of non-metallic or otherwise fragile parts to reduce cost and weight and save fuel. Also, present automobiles employ spoilers, low ground clearance, and small clearances between wheel wells and tires. These features also save weight and reduce drag. However, these same features also present serious difficulties when a modern automobile is disabled and must be towed. Shock-absorbing bumpers, non-metallic parts and spoilers cannot withstand the forces imposed when raising one end of an automobile by a sling attached between the automobile's axle and the boom of a tow truck. Second, the minimal ground clearance available makes engagement of the sling on the axle more difficult and time-consuming. Additional problems with conventional sling-type towing are created by modern, low-clearance parking garages which impede the use of any sling-type towing device which depends upon a boom.

Some of these disadvantages and problems are addressed by wheel-lift towing devices. These devices employ various means to lift a disabled vehicle by its wheels, rather than by the vehicle body structure. See, for example, U.S. Pat. No. 3,897,879, "Vehicle Towing Apparatus", which discloses a tow truck that employs a cradle which, in turn, supports the wheels of the disabled vehicle. The cradle is lifted by a boom attached to the ends of the cradle by slings.

Another type of device intended to overcome some of the disadvantages described above employs a parallel bar and strap system. The system has a beam which is positioned under one end of a vehicle to be towed, and in contact with the tire tread of each of the pair of wheels to be lifted. Then, L-shaped supports are attached to each end of the beam. Each support has a long portion which attaches to the beam and which spans the outside of the towed vehicle wheel. A short portion extends horizontally at a right angle from the long portion, generally parallel to the beam and to the axle of the disabled vehicle, and toward the centerline of the vehicle. The beam and short portion together form parallel members; each pair of members supports a wheel. Each wheel is then strapped to some part of its support to prevent the wheel from rolling out of its support when the towing and towed vehicles accelerate or decelerate. The beam is attached to the towing vehicle by means which allow the beam (and thus one end of the towed vehicle) to be raised and, in some cases, moved closer to the towing vehicle. It is important to decrease this distance, because the weight of the towed vehicle creates a moment about the rear wheels of the towing vehicle. The moment, if large enough, reduces the weight on the front wheels of the towing vehicle and can even lift the wheels. This in turn impedes steering or renders it impossible. It similarly affects braking. Countering this lifting effect requires that weight be added to the towing vehicle forward of its rear wheels, thus adding expense and depressing fuel economy. Shortening the lever arm mitigates this effect.

Currently available wheel-lift towing devices suffer from additional disadvantages. First, the straps can be time-consuming and difficult to use, especially in cold, wet, or other inclement weather conditions. Second, the contact between the parallel members and the wheel is sometimes unsatisfactory because the members contact only a small portion of the tire tread. In fact, some devices only make contact along a line because the L-shaped support is often made of square tubing or pipe. If the tire deflates after the vehicle is lifted, the wheel can drop between the parallel members. On the other hand, if the parallel members are brought closer together to eliminate this danger, the force necessary to roll the wheel out of the support is reduced. Separation of the towed and towing vehicles could occur more easily, causing a serious accident. In either case, the towing apparatus may fail in service.

The close spacing of the parallel members leads to another disadvantage. As the gap between the members decreases, parallel members must engage the lifted wheel farther below the center of the wheel, and well below the lower body line of the vehicle, i.e., an imaginary straight line extending along the vehicle side at the height of the lowest points on the vehicle body. As the distance between this lower body line and the highest point of contact with the lifted wheel increases, the tendency of the vehicle to roll out of the support in the event of acceleration or deceleration is increased.

Fourth, presently available wheel-lift devices generally place the beam and supports on, or very close to the ground before they are connected. Thus, the long portion of the support spanning the outside of the wheel requires several inches clearance. If the outside of the wheel, or any part of it, is in contact with or immediately adjacent to a curb or other obstruction, the wheel-lift device is even more difficult to use or possibly rendered useless.

Fifth, some of the present wheel-lift devices generally require that the centerline of the towing vehicle be colinear, or very nearly so, with the centerline of the towed vehicle.

Sixth, present wheel-lift devices generally require that the wheels of the vehicle to be lifted be turned straight, or very nearly so. If the wheels are turned, the distance between parallel members may be too great to provide adequate contact with both sides of the wheel.

Seventh, many present wheel-lift devices are severly hampered or rendered useless by uneven road surfaces, parking garage ramps, potholes, depressions, etc. Devices that can adapt to these situations do so in a mechanically undesirable manner which, among other things, places too much weight behind the rear axle of the towing vehicle.

Eighth, in order to lift the towed vehicle, some currently available wheel-lift devices tilt the wheel supports, so that the plane of the parallel members is not horizontal. The front parallel member supporting the lifted wheel may be at a lower height than the rear parallel member. This aggravates the tendency of the towed vehicle to roll out toward the towing vehicle. Even if the vehicle does not roll out, the vehicle body may be damaged because the rear parllel member is bulky in comparison to the small wheel-to-wheel well clearance in modern automobiles. It is especially desirable that any towing device not damage the body of the towed vehicle.

The apparatus disclosed and claimed in application Ser. No. 752,980 remedies the problems described above and eliminates the tendency of the towed vehicle to roll out of the wheel-lift support system. At low speeds, the towed vehicle does not have sufficient monentum to roll out. At high speeds, even though the towed vehicle might have sufficient momentum, the towing vehicles can not stop fast enough; thus, both towing and towed vehicles decelerate at about the same rate, which eliminates the risk of rolling out. Thus, rolling out is safely avoided without the use of cumbersome, time-consuming straps or other structure. The safety margin is smallest in a narrow band of relatively low speeds at around seventeen miles per hour.

SUMMARY OF THE INVENTION

The present invention preserves the advantages of wheel-lift towing devices over sling towing devices. In addition, it preserves the advantages of the wheel-lift apparatus disclosed and claimed in U.S. Pat. No. 4,637,623 and application Ser. No. 752,980, and provides new advantages as well.

The invention is generally directed to a vehicle towing apparatus that employs a wheel-lift vehicle support system including unique structural features to facilitate the use of such towing apparatus in circumstances and under a wide variety of conditions previously unattained by wheel-lift towing devices. The invention also addresses the need to position the towing apparatus in a favorable location on the towing vehicle, with various components arranged either directly above or forward of the vehicle's rear axle. Moreover, the unique arrangement of structural features comprising the invention also reduces the cost of manufacture as compared to many currently available wheel-lift tow trucks.

In one preferred embodiment, the towing apparatus of the present invention includes a frame, a column pivotally mounted to the frame, a generally horizontal boom extending rearwrdly from the column, a transverse support beam mounted to the rear end of the boom, two wheel support members mounted at opposing ends of the beam, and means for rotating the wheel support members in a generally horizontal plane relative to the beam. In preferred form, the mounting means comprises two tapered collars, one pivotally mounted to each end of the beam and adapted to removably and slidingly engage the wheel support member. The tapered construction further provides for rotation of the wheel support members in a generally vertical plane relative to the beam. In accordance with this embodiment, each wheel support member is an elongated arm with a wheel retainer, in the form of a curved plate, depending from one end of the arm. The arm itself may also include an offset to accommodate various wheel designs with laterally extending obstructions.

In order to eliminate even the slight risk of vehicle disengagement on "rolling out" in the event of misuse by the operator, the invention includes a front stop mounted on top of each tapered collar. Each front stop includes a pin extending inwardly from a socket toward the centerline of the towed vehicle. The pin is on the side of the tire of the towed vehicle which is closer to the towing vehicle, and thus obstructs the path the wheel would take upon rolling out.

The pivoting and tapering collars accomplish further objects of the invention, namely, to facilitate positioning of the wheel support members and to permit their angular displacement to accommodate varying towing environments.

The mounting of the collars on top of the support beam accomplishes another object of the invention, which is to allow proper positioning of the wheel support members even with the wheels of the towed vehicle in contact with, or immediately adjacent to, a curb or other obstacle.

The front stops mounted on the collars accomplish another object of the invention, which is to eliminate the risk, regardless of speed, or rolling out. The use of any kind of straps to restrain the wheel is unnecessary, and the front stops may be engaged far more rapidly than any known type of strap.

The depending and elongated surfaces of the wheel retainers and transverse beam accomplish another object of the invention by supporting the tire over a large area of its tread, including a portion above the lower body line of the towed vehicle, thus preventing a deflated tire from dropping through the wheel support while at the same time minimizing the possibility that a fully inflated wheel might roll up and out of the wheel support without necessitating the use of staps or other auxiliary wheel retention devices.

BRIEF DESCRIPTION OF THE DRAWINGS.

The novel features of the invention are set forth in the appended claims. The invention itself, however, together with further objects and attendant advantages thereof, will be best understood by reference to the following description taken in connection with the accompanying drawings in which:

FIG. 1 is a side view showing the present invention, mounted on a vehicle, towing a disabled automobile.

FIG. 2 is a perspective view of the invention mounted on a truck (shown in partial phantom) and shown supporting one wheel of a towed vehicle, the remainder of which is not shown.

FIGS. 3 and 4 are partial side views of the extendable boom showing the boom rotated into alternate positions to accommodate uneven surfaces.

FIG. 6 is a partial plan view of the invention showing a portion of the transverse support beam, one tapered collar, and one of the wheel support arms.

FIG. 7 is a partial elevation view of the invention shown in FIG. 6 and showing alternative positions of the wheel support arm holding a towed vehicle wheel.

FIG. 8 is a partial elevation view taken along line 8—8 of FIG. 6 and showing the invention supporting a wheel of a towed vehicle parked against a curb.

FIG. 9 is another perspective view showing the extendable boom, the transverse beam, and wheel support members with front stops.

FIG. 10 is a partial plan view of the improvement showing part of the transverse beam, part of a wheel support member, a tapered collar, and a front stop mounted on the collar.

FIG. 11 is a partial elevation view showing the front stop with pin removed, a tapered collar, and part of a wheel support member.

FIG. 12 is a detail view of one means for locking the pin and socket of the front stop together.

DESCRIPTION OF THE PREFERRED EMBODIMENTS

Figure 5:
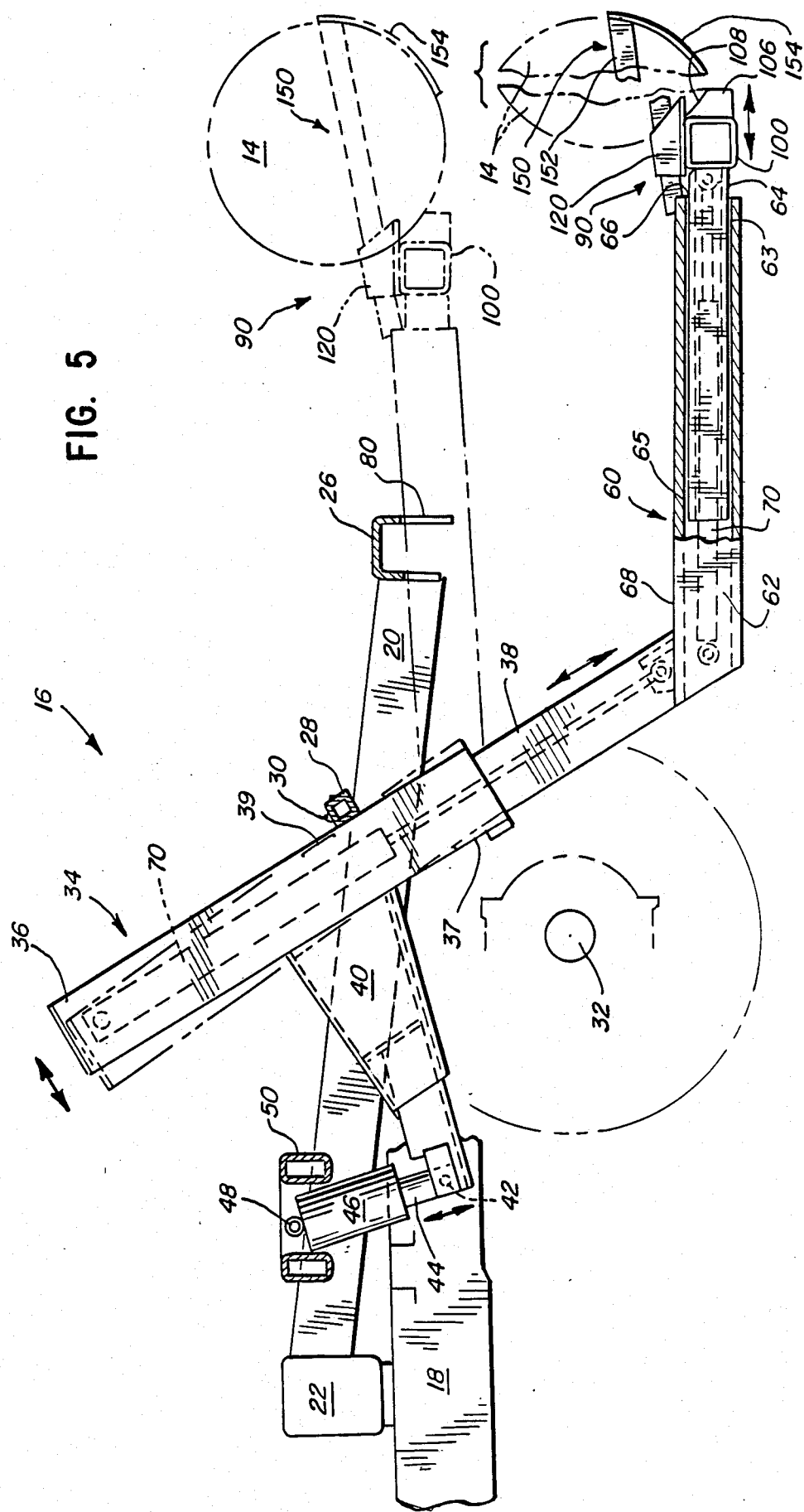
FIG. 5 is a side view of the invention showing in phantom the column rotated forward, the inner column member raised, and the boom retracted for traveling while towing a vehicle, one wheel of which is also shown in phantom. The extendable boom is partially broken away to show the boom hydraulic actuator.

The present invention may be mounted on any suitable vehicle. FIG. 1 shows a truck 10 towing a vehicle 12 by supporting the wheels 14 of the towed vehicle 12. Though not shown, the towing apparatus may alternatively support the rear wheels of the vehicle 12.

FIG. 2 shows towing apparatus 16 mounted on a truck chassis 18 shown in phantom. Two elongated supports 20 are each attached at one end to a front support 22 which is transverse to the centerline of chassis 18 and permanently anchored at each end to chassis 18. The opposite end of each elongated support 20 is affixed to a rear support 26, also transverse to the centerline of chassis 18 and permanently attached to chassis 18. Thus, supports 22 and 26, and elongated supports 20 form a rectangular frame, the long axis of which is in the same plane as the centerline of chassis 18.

An axle 28 is rotatably secured at each end in a socket 30, attached to an upper surface of one of elongated supports 20. Axle 28 is parallel to a rear vehicle axle 32 of chassis 18. A column 34 has a hollow outer member 36 which is attached to and rotates with axle 28. An inner member 38 is slidably enclosed within outer member 36 and extends downwardly from the lower open end of outer member 36. The ability of column 34 to pivot and telescope provides important advantages to the present invention. First, pivoting of column 34 allows the wheel support structure described below to be moved to accommodate surfaces displaced from or at an angle to the surface on which truck 10 rests. Second, the telescoping action of column 34 raises the towed vehicle 12. Third, the pivoting and telescoping motions of column 34 cooperate to place the wheel support structure in as nearly a horizontal plane as possible when vehicle 12 is lifted. This in turn reduces the tendency of vehicle 12 to roll out. Finally, the pivoting motion of column 34 helps to keep the weight of column 34 forward of the rear vehicle axle 32, reducing the undesirable moment arm created by towing apparatus 16.

It will be apparent to those skilled in the art that there are a variety of means by which pivoting of column 34 may be controlled. One means for pivoting column 34 is depicted in FIG. 5, and includes a lever arm 40 extending from the forward, lower surface of outer member 36. An end of arm 40 away from member 36 is pivotally attached by pin 42 to a piston 44 of a first hydraulic actuator 46. Actuator 46 is in turn pivotally attached by pin 48 to box 50 mounted between elongated supports 20. The arc through which column 34 rotates is determined by the stroke of arm 44 and the distance from pin 40 to axle 28. In the preferred embodiment, this arc is approximtely 12° to 18°. The size of actuator 46, stroke of piston 44, and length of arm 40 are calculated to provide the necessary rotation of column 34 while avoiding interference with the towing vehicle's driveshaft, which is not shown.

Returning to FIG. 2, wheel support structure 90, described below, is positioned and supported by boom 60, which is ridigly attached to the lower end of inner member 38. Boom 60 has a hollow outer boom member 62 slidably enclosing an inner boom member 64. Inner boom member 64 extends through an open end 66 of outer boom member 62. Movement of inner boom member 62 thus increases or decreases the length of boom 60. The upper surface 68 of outer boom member 62 forms an obtuse angle with the rear top surface of inner column member 38. The long axes of column 34 and boom 60 both lie in a plane which is perpendicular to axle 28 and which includes the centerline of chassis 18. The telescoping movement of boom 60 accomplishes two purposes. First, it allows the wheel support structure 90 to be extended under towed vehicle 14 in contact with wheels 12. After the towed vehicle is engaged, retracting boom 60 moves towed vehicle 14 closer to truck 10, This in turn reduces the moment created by towing apparatus 16 about the rear axle 32 of truck 10. When raised, as shown in phantom in FIG. 5, boom 60 fits into notch 80 in rear support 26.

Telescoping of column 34 and boom 60 may be accomplished by a variety of means apparent to those skilled in the art. FIG. 5 shows hydraulic actuators 70 operatively associated with outer and inner members 36 and 38, and with outer and inner boom members 62 and 64, respectively. Friction due to telescoping is minimized by pads located between outer and inner members 36, 38, 62 and 64. Outer member 36 has a pad 37 at its lower end on the inside surface; pad 37 is coated with a low-friction material. Pad 37 supports and prevents binding of inner member 38 against outer member 38. Inner member 38 has a similar pad 39 at its upper end. Pad 39 prevents binding of the upper end on inner member 38. Boom members 62 and 64 are provided with pads 63 and 65 which accomplish the same friction-reducing and support functions as pads 37 and 39.

The top of column 34 may be equipped with sheaves, not shown, for use with a power-operated winch mounted elsewhere on truck 10.

Wheel support structure 90 is shown in FIGS. 2 and 7 and is comprised generally of a transverse beam 100, collars 120 and wheel supports 150. Transverse beam 100 is pivotally attached to a flange 102 extending from an end 104 of inner column member 64. Transverse beam 100 pivots about an axis lying in the plane containing the long axes of column 34 and boom 60, through an acr extending to either side of a line coincident with the extended axis of boom 60. Transverse beam 100 may be locked in a desired position with respect to boom 60 by any of a variety of means known in the art and is not shown here. The ability to pivot transvere beam 100 with respect to boom 60 insures that towed vehicle 12 has a turning radius equal to or smaller than that of truck 10. Consequently, towed vehicle 12 trails properly and there is no danger that a sharp turn by truck 10 will cause vehicle 12 to be forcibly dislodged from wheel support structure 90. Pivoting of transverse beam 100 also allows towing apparatus 16 to be used even though truck 10 is at an angle to vehicle 12. Transverse beam 100 also is extended or retracted with the telescoping of boom 60. A show 106 is slidbly mounted on each end of transverse beam 100. Each shoe 106 may be manually moved and locked by means not shown at interals along the long axis of transverse beam 100. By positioning shoes 106 at different distances from the pivotal attachment of transverse beam 100 to boom 60, the length of transverse beam 100 is adjusted to suit towed vehicles of different track widths. Thus, the invention may be used with vehicles of different sizes and manufacture.

Another advantage of the present invention is contact with a significant portion of the tire tread of wheels 14. This object is partially achieved by a sloping surface 108 on each shoe 106. Each surface 108 is rectangular and attached to the side of the shoe 106 away from boom 60. The top edge of surface 108 is nearer transverse beam 100 than is the bottom edge so that the surface slopes downwardly and away from an upper surface 110 of cross beam 100.

Refer now to FIGS. 6, 7, and 8. Each shoe 106 supports a tapering collar 120 pivotally attached to its upper surface. Pivoting of collars 120 accomplishes an important object of the invention by allowing wheel support arms 150 to be independently rotated through a horizontl plane. Collars 120 pivot independently because a vehicle to be towed may have been damaged, resulting in each wheel being turned in a different direction. This could occur, for example, if the steering linkage of the vehicle was broken, or if an axle or wheel was bent. Rotation through an arc of 360° is permitted by mounting each collar on a base plate 122. Each base plate 122 has a cylindrical pivot 126 depending from its lower surface. Each pivot is rotatably retained within a tube 128 fixed to the side of show 106 away from sloping surface 108. Any one of a variety of means readily apparent to those skilled in the art may be used to control rotation of collar 120.

The tapering shape of each collar 120 is also significant, because it permits limited movement or rotation of the wheel support arms 150 in the generally vertical direction. Each collar 120 has a rectangular cross section in a plane perpendicular to the plane containing wheel 14. Collar 120 has a mouth 134 at one end to receive an arm 152 of wheel support 150, and an opposite open end 136 through which arm 152 extends. Mouth 134 is rectangular; open end 136 is similar but smaller. Open end 136 is slightly larger than arm 152, which is also rectangular in cross-section. The cross section of collar 120 continuously tapers from mouth 134 to open end 136. A locking pin 140 protrudes upwardly inside collar 120; pin 140 is located near mouth 134. Thus, as shown in FIG. 7, when arm 152 of wheel support 150 is inserted through collar 120, wheel support 150 can tilt or rotate vertically in an arc centered on the bottom edge of open end 136 and lying in a plane of wheel 14. The tilting of arm 152 permits wheel support arm 150 to be engaged even if wheel 14 rests on a surface which is displaced from, or angled with respect to, the surface upon which vehicle 12 rests. The vertical movement of wheel support 150 therefore combines with the vertical movement of boom 60 and rotation of column 34 to accomplish this object of the invention. The ability to lift wheel support 150 is also useful if there is an obstacle next to wheel 14. Also, tilting of arm 152 allows arm 152 to be moved inside collar 120 without interference with pin 140, the purpose of which is described below. It will be appreciated by those skilled in the art that the movement of wheel support arms 150 in the art tapering collars 120 may also be achieved by other collar structures not described here.

As best shown in FIG. 6, arm 152 is offset or bowed. The concave sides of both arms 152 face each other, and assist in avoiding interference between the arms 152 and hubcaps or other projections on the outer surfaces of wheels 14. At an end of each arm 152 away from collar 120, a wheel retainer 154 is mounted on the concave side of arm 152. Each retainer 154 is a curved plate forming a segment of a cylinder, the axis of which lies substantially at a right angle to the long axis of the arm 152 to which wheel retainer 154 is attached, and lying above arm 152. The concave surface of wheel retainer 154 faces sloping surface 108 on shoe 106. Wheel 14 is supported between sloping surface 108 and wheel retainer 154. The large surface area of retainer 154 provides broad contact with the tire tread of wheel 14. The surface of wheel retainer 152 has ribs 153 in the plane of wheel 14 to increase friction between retainer 152 and wheel 14. Wheel retainer 154 also has a lip 155 on its edge away from arm 152. Ribs 153 and lip 155 prevent wheel 14 from slipping sideways off of wheel retainer 152. Arm 152 prevents wheel 14 from slipping off wheel retainer 154 in the opposite direction. Because wheel retainer 152 is a thin, curved structure, it fits readily into the narrow space provided between wheel 14 and the surrounding wheel well of vehicle 12. Damage to the body of vehicle 12 is thus avoided.

A gusset 156 between arm 152 and wheel retainer 154 strengthens wheel support 150 and serves an additional purpose. In case of a sudden stop when towing, towed vehicle 12 tends to roll forward out of its support. Gussett 156 inhibits this tendency because the tire tread of wheel 14 is resting against the edge of gusset 156. Hence, friction between the narrow edge of gusset 156 and the tread of wheel 14 gives rise to a moment acting opposite to the monent tending to roll wheel 14 out.

The shape and dimensions of wheel retainer 154 also give rise to major advantages of the invention. As shown in FIG. 7, the horizontal depth of wheel retainer 154 is represented by "x". The height of wheel retainer 154 is represented by "y". As x and y increase, the towing stability of the invention is improved compared to other wheel-lift devices. As can be seen in FIGS. 1 and 5, an increase in y causes the top of retainer 154 to be much closer to the center of wheel 14 and to extend above the lower body line of the vehicle 12. The broad contact in the vertical direction substantially reduces the ability of the towed vehicle to roll out. An increase in y also eliminates the need for straps employed by other wheel-lift devices. The vertical dimension of shoe 106, while not as great, is also helpful in this regard. Similarly, an increase in x reduces the gap between retainer 154 and shoe 106. Therefore, the possibility that a damaged, turned, or deflated tire could drop between shoe 106 and retainer 154 is lessened. In the preferred embodiment, the vertical dimension between the top and bottom of wheel retainer 154 is seven and one-half inches. The horizontal dimension from the front edge of retainer 154 to its rear edge is from four to five inches. Thus, wheel 14 is supported in both vertical and horizontal directions by broad planar contact, instead of the point-to-point or linear contact of the prior art.

Turning now to FIGS. 9 through 12, the ability to resist roll out is fruther enhanced by employing a stop means 180. Each stop means 180 includes a socket 182 attached to the top of collar 120. As can be seen in FIG. 10, a stop member or pin 184 is slidably engaged within socket 182. Pin 184 is substantially longer than socket 182, and projects toward the center of transverse beam 100 and boom 60, as shown in FIG. 9. When wheel 14 is in the towing position, and is supported by wheel support 150, pin 184 protrudes into the path wheel 14 would take upon rolling out. Furthermore, because pin 184 is at a significant height above surface 108, it contacts wheel 14 very near its horizontal centerline, preventing the wheel from climbing over pin 184.

Each pin 184 is equipped with a handle 186 which allows pin 184 to be selectively retracted from its operative position. Any convenient means, such as a key 188 shown in FIG. 12, is employed to insure that pin 184 will not disengage from socket 182 after pin 184 is inserted and handle 186 also tends to prevent unlocking because it depends from pin 184.

As an alternate embodiment, pin 184 may be inserted through holes in the sides of collars 120. Thus, after wheel support member 150 is inserted and engaged with pin 140, pin 184 is inserted through collar 120. In that way, pin 184 prevents roll-out, and also prevents inadvertent lifting and disengagement of wheel support arm 150. In this embodiment, pin 158 and holes 160 are unnecessary and may be deleted.

Front stop 180 also provides an additional advantage. If for any reason the means used to prevent rotation of collar 120 fails, front stop 180 will prevent lateral movement and potential disengagement of wheel support member 150. Thus, wheel 14 will not drop.

Engagement of the towing device with the wheels of a vehicle 12 occurs as follows. Referring first to FIG. 7, shoes 106 are adjusted on crossbeam 100, which is then moved so that each sloping surface 108 is in contact with one of a pair of wheels 14. Note that, as shown in FIG. 8, wheel 14 may abut a curb 160 or similar obstacle extending as much four inches or more above the bottom of the tire. Each wheel support 150 is next inserted into its collar 120, and rotated about pivot 126 to bring wheel support 150 adjacent to the outer surface of wheel 14. Base plate 122 is then locked to shoe 106 by any conventional means not shown. While maintaining the wheel support 150 in its tilted position (as shown in phantom), support 150 is moved to bring wheel retainer 154 into contact with the tread of tire 14. Support 150 is then lowered, engaging pin 140 with one of a plurality of holes 142 spaced at regular intervals on the bottom surface of arm 152. Pin 140 is engaged with whichever of the plurality of holes 142 provides a snug fit of wheel retainer 154 with wheel 14.

Pin 184 is then rotated by means of handle 186 so that key 188 permits pin 184 to be fully inserted into socket 182. After insertion, pin 184 is again rotated so that handle 186 points downwardly, locking pin 184 in position.

As boom 60 is raised, support of wheel 14 is transferred from the surface upon which it rests to surface 108 and wheel retainer 154. The weight of wheel 14 upon wheel retainer 154 creates a moment acting about the bottom edge of mouth 134 of collar 120, thus urging the upper surface of wheel support arm 152 against the upper edge of open end 136 of collar 120. Because the cross section of open end 136 is only slightly larger than the cross section of arm 152, contact between the upper edge of openend 136 and the upper surface of arm 152 prevents disengagement of pin 140 from hole 142. In the event that towed vehicle 12 bounces, thus temporarily removing the load on wheel supprts 150, disengagement of supports 150 from collars 120 is prevented by a pin 158 placed vertically through one of a plurality of holes 160 in the portion of arm 152 which projects from open end 136 of collar 120. Boom 60 and column 34 are then retracted, as shown in FIG. 5, moving the towed vehicle forward and up into the towing position, as shown in phantom.

FIGS. 3 and 4 show the tilting of boom 60 through an arc for lifting wheels 14 on different types of angled, displaced, or irregular surfaces. Furthermore, tilting of boom 60 also minimizes the distance between the surface and boom 60, which is important in light of the low ground clearance of many modern vehicles.

The ability to move wheel supports 150 in the vertical direction is also advantageous when a towed vehicle is lowered. When wheel 14 is supported on surface 108 and retainer 154, the weight of vehicle 12 tends to force wheel 14 into the gap between the supporting surfaces. However, when the vehicle is lowered and its weight transferred from towing apparatus 16 back to the ground, slight additional lowering by rotating or extending column 34 tends to lift wheel 14 and rotate wheel support 154 in the vertical direction. This action frees wheel support 154 from wheel 14, and eliminates any forces tending to bind wheel support 154 against wheel 14, or possibly, pin 142. The towing apparatus is then easily disengaged by withdrawing pins 184, unlocking and rotating collars 120, by manually lifting wheel supports 154 clear of pins 142 and withdrawing supports 54 from collars 120. Boom 60 may then be retracted and raised.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An apparatus for use in lifting and towing a vehicle, comprising:
   a support beam positionable below said vehicle and having end portions positionable adjacent an opposed pair of wheels on said vehicle;
   two wheel support members, each having an elongated arm and a wheel retainer;
   two collars, each connected to one of the end portions of said support beam and each adapted to mount one of said wheel supports to said support beam in a vehicle lifting position; and
   two rigid stop members each being selectively movable into an operative position above one of said end portions of said beam for preventing said pair of wheels from rolling over said support beam.

2. The vehicle lifting and towing apparatus of claim 1 wherein said stop members are each carried by one of said collars and project inwardly from the outer sides of said pair of wheels, said stop members each being retractable to a position laterally outside said pair of wheels.

3. The vehicle lifting and towing apparatus of claim 1 wherein each said stop member also includes a disengageable lock for holding said stop member in its operative position.

4. An apparatus for use in lifting and towing a vehicle, comprising:
   a support beam positionable below said vehicle and having end portions positionable adjacent an opposed pair of wheels on said vehicle;
   two wheel support members, each having an elongated arm and a wheel retainer;

two collars, each connected to one of the end portions of said support beam and each adapted to mount one of said wheel supports to said support beam in a vehicle lifting position; and two stop members, each located above one of the end portions of said support beam and projecting inwardly from the outer sides of said pair of wheels to prevent said pair of wheels from rolling over said support beam; said stop members also being retractable to a non-operative position.

5. An apparatus for use in lifting and towing a vehicle, comprising:

a support beam positionable below said vehicle and having end portions positionable adjacent an opposed pair of wheels on said vehicle;

two wheel support members, each having an elongated arm and a wheel retainer;

two collars, each connected to one of the end portions of said support beam and each adapted to mount one of said wheel supports to said support beam in a vehicle lifting position;

said collars having a configuration to permit vertical or horizontal movement of the wheel support members when received within said collars; and stop means located generally above said beam for preventing said pair of wheels from rolling over said support beam.

6. The vehicle lifting and towing apparatus of claim 5 wherein said collars are pivotally connected to the end portions of said support beam to thereby permit said horizontal movement of said wheel support members.

7. An apparatus for use in lifting and towing a vehicle, comprising:

a support beam positionable below said vehicle and having end portions positionable adjacent an opposed pair of wheels on said vehicle;

two wheel support members, each having an elongated arm and a wheel retainer;

two collars, each connected to one of the end portions of said support beam and each adapted to mount one of said wheel supports to said support beam in a vehicle lifting position; and two stop members each carried by said support beam and projecting inwardly from the outer sides of said pair of wheels, said stop members each being retractable to a position laterally outside said pair of wheels.

* * * * *